(12) United States Patent
Li et al.

(10) Patent No.: US 12,528,312 B2
(45) Date of Patent: Jan. 20, 2026

(54) OMNI WHEEL AND MOVING DEVICE

(71) Applicant: Shanghai Bangbang Robotics Co., Ltd., Shanghai (CN)

(72) Inventors: Jianguo Li, Shanghai (CN); Jie Liu, Shanghai (CN); Yongqiang Li, Shanghai (CN); Xiaodong Wang, Shanghai (CN); Shiwei Jiang, Shanghai (CN)

(73) Assignee: Shanghai Bangbang Robotics Co., Ltd., Shanghai (CN)

( * ) Notice: Subject to any disclaimer, the term of this patent is extended or adjusted under 35 U.S.C. 154(b) by 262 days.

(21) Appl. No.: 18/548,931

(22) PCT Filed: Jan. 29, 2022

(86) PCT No.: PCT/CN2022/074986
§ 371 (c)(1),
(2) Date: Sep. 5, 2023

(87) PCT Pub. No.: WO2022/237242
PCT Pub. Date: Nov. 17, 2022

(65) Prior Publication Data
US 2024/0149613 A1    May 9, 2024

(30) Foreign Application Priority Data

May 11, 2021  (CN) .......................... 202110510642.6

(51) Int. Cl.
*B60B 19/00*   (2006.01)
*B60B 19/12*   (2006.01)

(52) U.S. Cl.
CPC ............ *B60B 19/003* (2013.01); *B60B 19/12* (2013.01); *B60B 2900/131* (2013.01); *B60B 2900/133* (2013.01)

(58) Field of Classification Search
CPC ........................... B60B 19/0003; B60B 19/12
See application file for complete search history.

(56) References Cited

U.S. PATENT DOCUMENTS 3,789,947 A * 2/1974 Blumrich .............. B60B 19/003
                                                  301/5.23
5,383,715 A * 1/1995 Homma ................ B60B 19/003
                                                  301/5.1
(Continued)

FOREIGN PATENT DOCUMENTS

CN      207241302 U     4/2018
JP      2021075147 A    5/2021
(Continued)

*Primary Examiner* — Jason R Bellinger

(57) ABSTRACT

An omni wheel includes a hub bracket and roller components. Each roller component includes a first roller assembly and a second roller assembly. The first roller assembly includes a roller bracket and a first roller structure. The second roller assembly includes a second shaft and a second roller structure, and the second shaft includes a second shaft body and a limiting portion. The second shaft body is connected and locked to a first connection structure to axially limit the second roller structure with respect to the limiting portion and the first connection structure. The omni wheel can ensure that second rollers will not shake and oscillate during running of the omni wheel and thus reduce vibrations and noise of the omni wheel, therefore improving the running stability.

12 Claims, 9 Drawing Sheets

(56) References Cited

U.S. PATENT DOCUMENTS

| | | | | |
|---|---|---|---|---|
| 8,011,735 B2 * | 9/2011 | Scogna | ................ | B60B 19/003 |
| | | | | 301/5.23 |
| 9,365,076 B2 * | 6/2016 | Bando | ................... | B60B 19/003 |
| 10,675,912 B1 * | 6/2020 | Liang | ................... | B60B 19/003 |
| 11,273,668 B2 * | 3/2022 | Sugimoto | ............... | B60B 19/12 |
| 11,938,752 B2 * | 3/2024 | Sugimoto | ............. | B60B 19/125 |

FOREIGN PATENT DOCUMENTS

| KR | 19990000611 A | 1/1999 |
|---|---|---|
| WO | 2019/107228 A1 | 6/2019 |

\* cited by examiner

OMNI WHEEL AND MOVING DEVICE

The present application claims the priority to Chinese Patent Application No. 202110510642.6, filed in the China National Intellectual Property Administration on May 11, 2021 and entitled "OMNI WHEEL AND MOVING DEVICE", which is incorporated herein by reference in its entirety.

TECHNICAL FIELD

The present application relates to the technical field of moving apparatuses, and in particular to an omni wheel and a moving device.

BACKGROUND

An omni wheel is a large roller comprising multiple rollers. The omni wheel can rotate around a hub as a whole, and each roller can rotate around its own center, so that the omni wheel can roll forward or slide left and right. In a moving device, such as a robot, multiple omni wheels are combined together to achieve 360-degree omnidirectional movement.

Omni wheels are generally divided into single-row omni wheels and multi-row omni wheels, wherein multi-row omni wheels use multiple rows of alternately arranged small rollers to form a tire tread having a consistent projection. Since the rollers form a multi-row structure, during use on a bumpy road, a roller bracket is prone to collision with obstacles, causing inconvenience in use. Moreover, because the multi-row structure has a relatively complex structure and many parts, the production cost is high, and the assembly is complicated. In a single-row omni wheel, a consistent tire tread is formed by small rollers embedded in each other, and thus there is no problem like that in the multi-row omni wheel. However, due to the large gap between the individual driven wheels of the single-row omni wheel, the entire wheel has poor consistency, and thus generates relatively large noise and vibrations.

In order to solve the problem of consistency, a solution in which a large roller and a small roller share one bracket to achieve a smaller gap between the large roller and the small roller is usually used. However, the omni wheel is still prone to generating noise and vibrations in practical applications and has poor running stability.

SUMMARY

In view of the above problems, the embodiments of the present disclosure provide an omni wheel and a moving device, which have good running stability and low noise and vibration.

In order to achieve the above objective, the embodiments of the present disclosure provide the following technical solutions.

In a first aspect of the embodiments of the present disclosure, an omni wheel is provided. The omni wheel comprises a hub bracket and a plurality of roller components each connected to the hub bracket, wherein the roller component comprises a first roller assembly and a second roller assembly; the first roller assembly comprises a roller bracket and a first roller structure arranged on the roller bracket, and the roller bracket is provided with a first connection structure; the second roller assembly comprises a second shaft and a second roller structure mounted to the second shaft, the second shaft comprising a second shaft body and a limiting portion protruding from an outer peripheral surface of the second shaft body; in one of the roller components, the second shaft body is connected and locked to the first connection structure to limit the second roller structure between the limiting portion and the first connection structure; and the plurality of roller components are arranged in a circumferential direction of the hub bracket, such that the first roller structure and the second roller structure in each roller component jointly form a full-circle roller structure.

The omni wheel according to the embodiments of the present disclosure has the following advantages.

Only one roller bracket is provided in one roller component, such that the two rollers are mounted by means of one roller bracket. Specifically, the second shaft of the second roller assembly is fixedly connected to the first connection structure on the roller bracket of the first roller assembly, so that the gap between the rollers is smaller, ensuring the integrity of the outer contour of the omni wheel. Further, the second shaft is provided with the limiting portion to allow the second shaft body to be connected and locked to the first connection structure, so that the second roller structure is limited by means of the limiting portion and the first connection structure, so as to ensure that the second roller structure will not shake and oscillate during running of the omni wheel, thereby reducing vibrations and noise of the omni wheel, improving the running stability and the usage comfort.

As an improvement of the omni wheel according to an embodiment of the present disclosure, the first connection structure is arranged at a circumferential end of the roller bracket, the other circumferential end of the roller bracket is provided with a second connection structure configured to be connected to an end portion of a second shaft body in the adjacent roller component in an insertion manner, and the plurality of roller components are joined end-to-end in the circumferential direction to form a full-circle roller structure in which the first roller structures and the second roller structures are alternately arranged.

As a further improvement of the omni wheel according to an embodiment of the present disclosure, the second connection structure fits with or presses against the limiting portion on the second shaft body to which the second connection structure is connected in an insertion manner; and/or the second connection structure is provided with an insertion hole into which the end portion of the second shaft body in the adjacent roller component is inserted, and at least one of the insertion hole and the end portion of the second shaft body to which the second connection structure is connected in an insertion manner is provided with a guide face for guiding the insertion movement.

As a further improvement of the omni wheel according to an embodiment of the present disclosure, the second shaft body is connected and locked to the first connection structure by means of a first locking structure; and the first locking structure comprises a first screw by which the first connection structure is fixedly connected to the second shaft body; or the second shaft is a screw, the second shaft comprises a second head and a second rod, the second rod passing through the second roller structure and screwed to the first connection structure, and the second head forming the limiting portion, wherein the second shaft forms the first locking structure; or the second shaft is a screw, and the second shaft comprises a second head and a second rod, the second rod passing through the first connection structure and the second roller structure, the second head being connected and locked to the first connection structure, and the limiting portion passing through the second rod to limit the second roller structure between the limiting portion and the first connection structure.

As a further improvement of the omni wheel according to an embodiment of the present disclosure, the second roller structure comprises a second roller and a second bearing, the second roller being rotatably mounted to the second shaft by means of the second bearing, and an inner ring of the second bearing being clamped between the limiting portion and the first connection structure.

As a further improvement of the omni wheel according to an embodiment of the present disclosure, the roller bracket comprises a first supporting portion and a second supporting portion arranged opposite each other, a first connection portion for connecting the first supporting portion to the second supporting portion, and a second connection portion for connecting the first connection portion to the hub bracket, the first connection structure being arranged at a position where the first connection portion is joined to the second supporting portion; the first roller assembly further comprises a first shaft, and the first roller structure is mounted to the first shaft; and the first supporting portion, the second supporting portion and the first shaft are connected and locked to each other to limit the first roller structure between the first supporting portion and the second supporting portion.

As a further improvement of the omni wheel according to an embodiment of the present disclosure, the first shaft is a screw, the first shaft comprises a first head and a first rod, the first rod passing through the first supporting portion and the first roller structure and screwed to the second supporting portion, and the first shaft forms a second locking structure.

As a further improvement of the omni wheel according to an embodiment of the present disclosure, the first roller structure comprises a first roller and a first bearing, the first roller being rotatably mounted to the first shaft by means of the first bearing, and an inner ring of the first bearing being clamped between the first supporting portion and the second supporting portion.

As a further improvement of the omni wheel according to an embodiment of the present disclosure, the roller bracket comprises a second connection portion for connecting the roller components to the hub bracket, and the hub bracket comprises a plurality of mounting portions configured to be connected to the second connection portions of the individual roller components, each of the mounting portions comprising a guide slot for guiding and limiting the mounting of the second connection portion into the mounting portion.

In a second aspect of an embodiment of the present disclosure, a moving device is provided. The moving device comprises a body, and further comprises an omni wheel as described above mounted to the body.

Since the moving device according to an embodiment of the present disclosure uses the forgoing omni wheel, the omni wheel in the moving device runs stably with low noise and vibration.

DETAILED DESCRIPTION OF THE EMBODIMENTS

Figure 1:
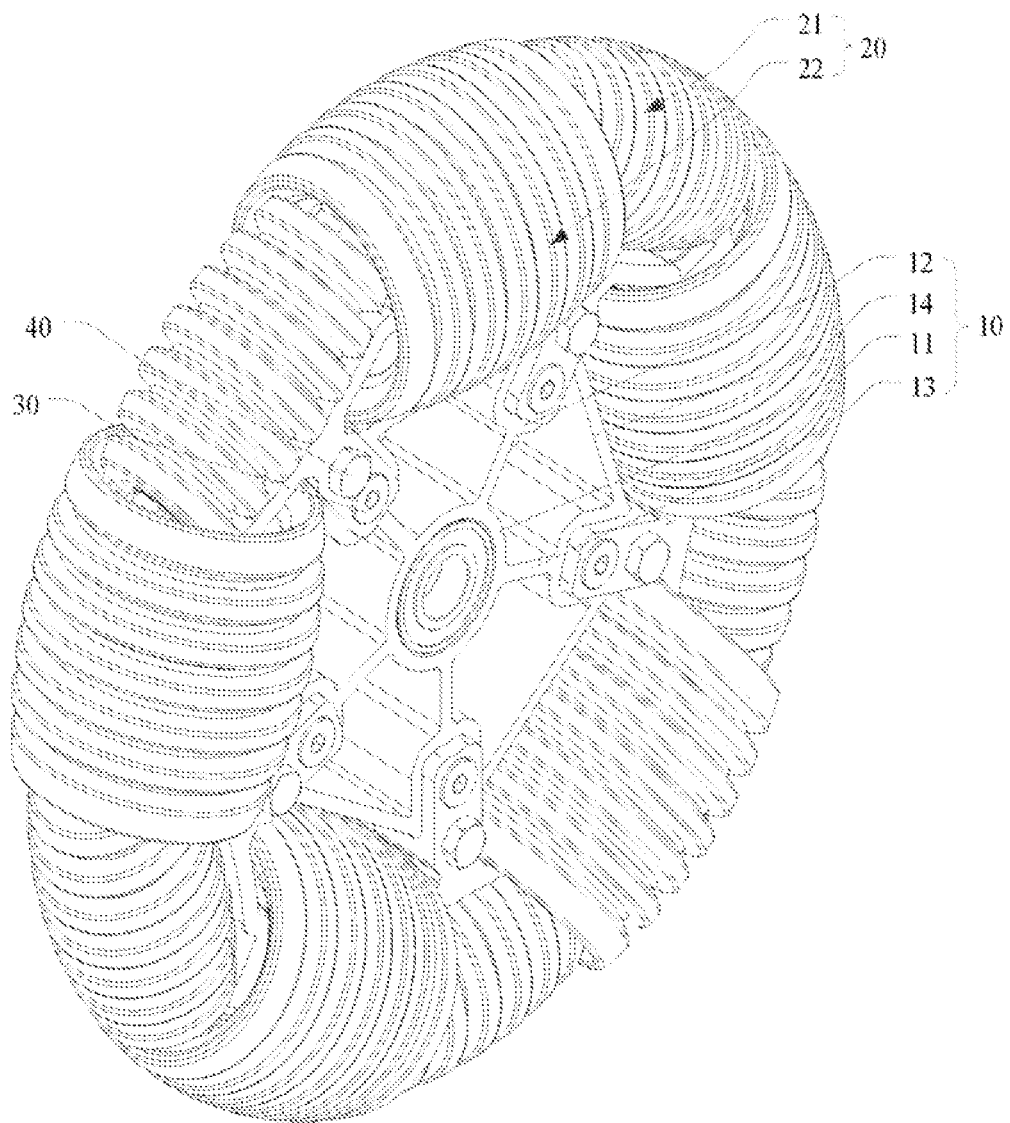
FIG. 1 is a perspective view of an omni wheel according to an embodiment of the present disclosure.

In the related art, a large roller and a small roller of an omni wheel share one bracket, and the large roller and the small roller are connected in a structure in which a mounting shaft extends from a bracket side of the small roller, a shaft of the large roller is sleeved on the mounting shaft, and the shaft of the large roller is fixed to the mounting shaft by means of a fastener. A bearing is provided between the large roller and the shaft thereof to achieve rotation of the large roller with respect to the shaft thereof. Such a structural configuration allows the large roller and the small roller to be closer to each other, but is still prone to generating noise and vibrations in practical applications and has poor running stability.

The inventors of the present application have found by studies that the noise and vibrations of the omni wheel having the above structure are mainly generated at the large roller, since the shaft of the large roller is fixed to the bracket of the small roller, and the large roller itself is supported on the shaft by means of the bearing with no positioning, so that the large roller is prone to oscillating and shaking during running of the omni wheel, resulting in generation of noise and vibrations and poor running stability. In addition, the axis of the fastener for connecting the shaft of the large roller to the mounting shaft does not coincide with the axis of the shaft of the large roller, which is easy to cause local stagnation due to uneven force during the assembly and use of the omni wheel and in turn affects the running stability of the omni wheel.

In another related art, two small roller brackets are used to fix the large roller. This method requires high assembly precision, and the circumferential errors are easy to accumulate, resulting in the failure of assembly or an excessively large assembly gap. The failure of assembly necessitates re-machining of the structural parts, affecting the production efficiency and increasing the production costs, and the excessively large assembly gap will cause the assembled omni wheel to generate high noise and vibrations and cause poor running stability.

In view of this, the embodiments of the present disclosure provide an omni wheel, in which a second shaft is provided with a limiting portion, and the second roller structure is axially limited by means of locking the roller bracket to the second shaft, so as to ensure that the second roller structure will not shake and oscillate during running of the omni wheel and thus reduce vibrations and noise of the omni wheel, improving the running stability and the usage comfort.

In order to make the above objectives, features, and advantages of the embodiments of the present disclosure clearer and easier to understand, the technical solutions in the embodiments of the present disclosure will be described clearly and completely below with reference to the accompanying drawings in the embodiments of the present disclosure. Apparently, the embodiments described are merely some of the embodiments, rather than all the embodiments of the present disclosure. On the basis of the embodiments of the present disclosure, all the other embodiments obtained by those of ordinary skill in the art without any inventive efforts shall fall within the scope of protection of the present disclosure.

Figure 2:
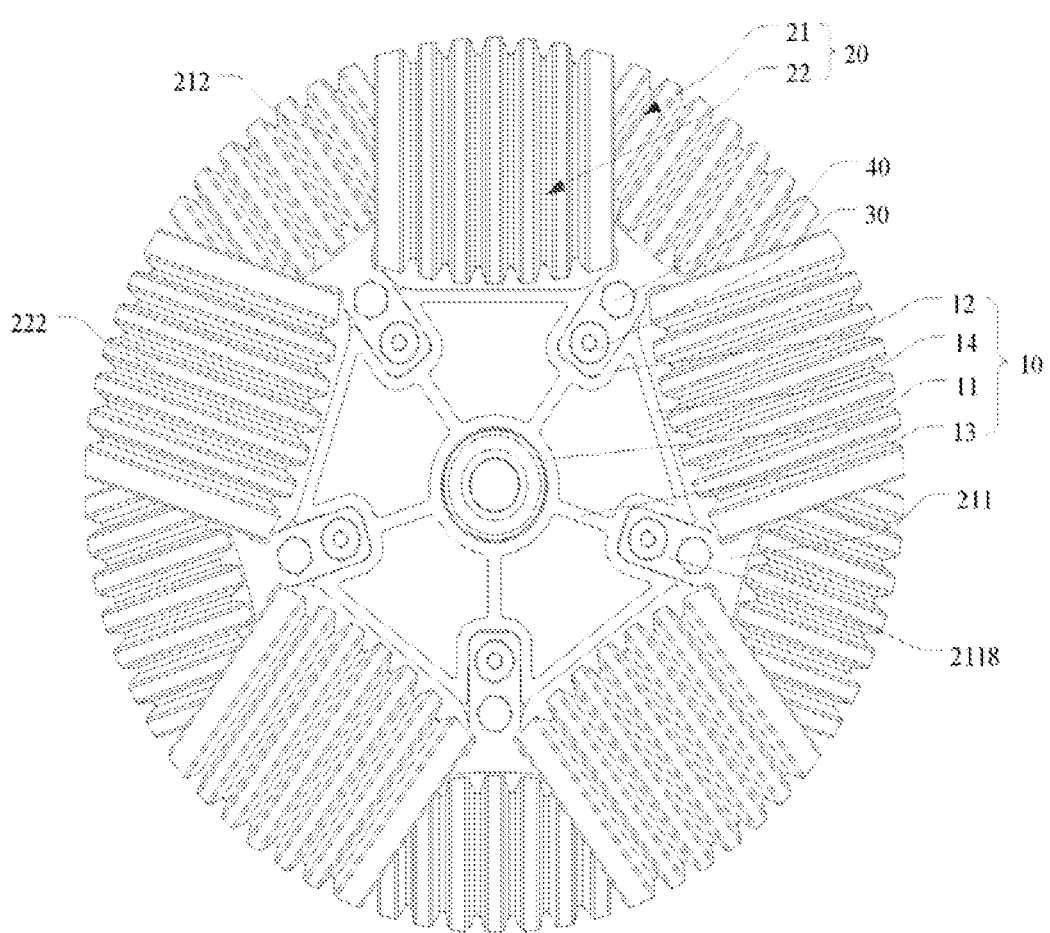
FIG. 2 is a front view of an omni wheel according to an embodiment of the present disclosure.
Figure 3:
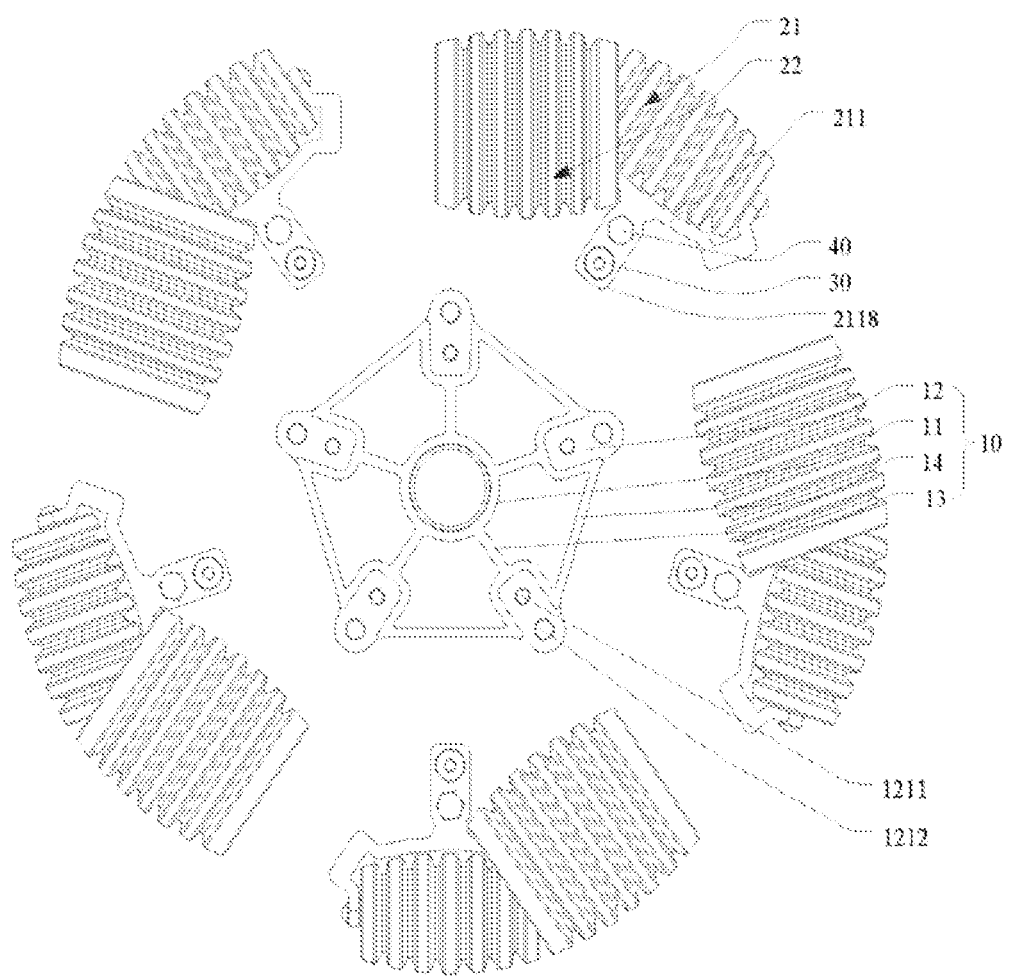
FIG. 3 is an exploded view of a hub bracket and the individual roller components of an omni wheel according to an embodiment of the present disclosure.

FIG. 1 is a perspective view of an omni wheel according to an embodiment of the present disclosure, FIG. 2 is a front view of an omni wheel according to an embodiment of the present disclosure, and FIG. 3 is an exploded view of a hub bracket and roller components of an omni wheel according to an embodiment of the present disclosure.

As shown in FIGS. 1 to 3, the omni wheel according to the embodiments of the present disclosure comprises a hub bracket 10 and a plurality of roller components 20 each connected to the hub bracket 10. The hub bracket 10 is configured to be connected to a moving device to allow the omni wheel to be mounted to the moving device, so that the moving device can move in all directions by means of the omni wheel. The plurality of roller components 20 are arranged in a circumferential direction of the omni wheel to form a full-circle roller structure with outer contour forming a complete and consistent tire tread (which will be specifically described below).

Figure 4:
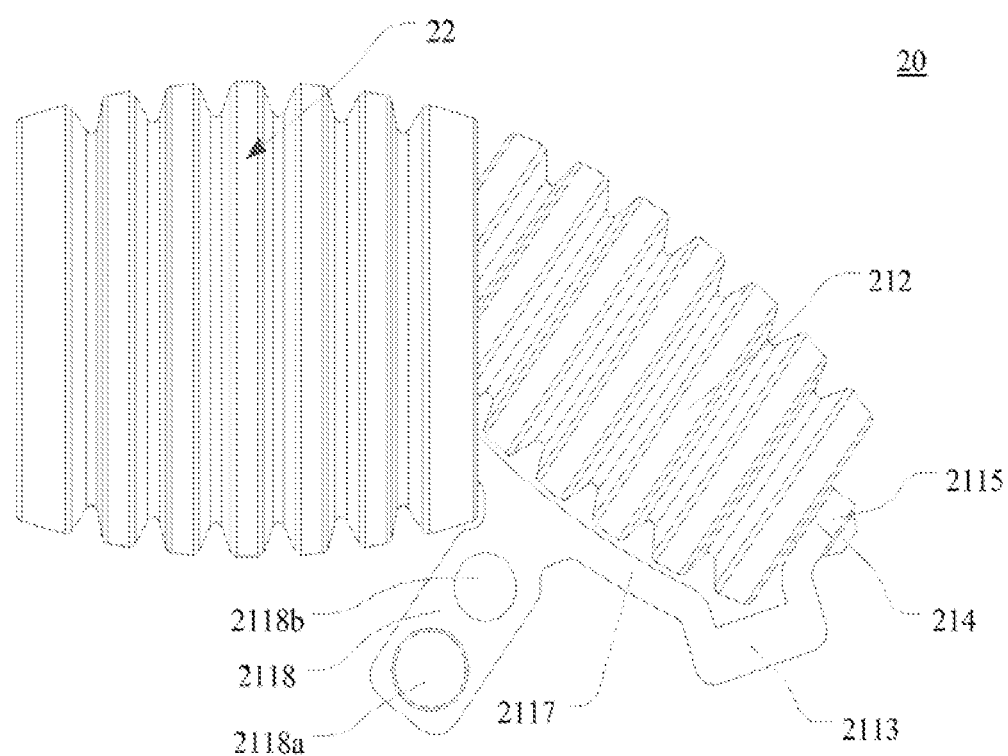
FIG. 4 is a schematic structural view of a roller component in FIG. 3.

FIG. 4 is a schematic structural diagram of a roller component in FIG. 3. As shown in FIG. 4, the roller component 20 comprises a first roller assembly 21 and a second roller assembly 22, wherein the first roller assembly 21 comprises a roller bracket 211 and a first roller structure arranged on the roller bracket 211, the first roller structure comprising at least a first roller 212 rotatably arranged on the roller bracket 211.

Figure 5:
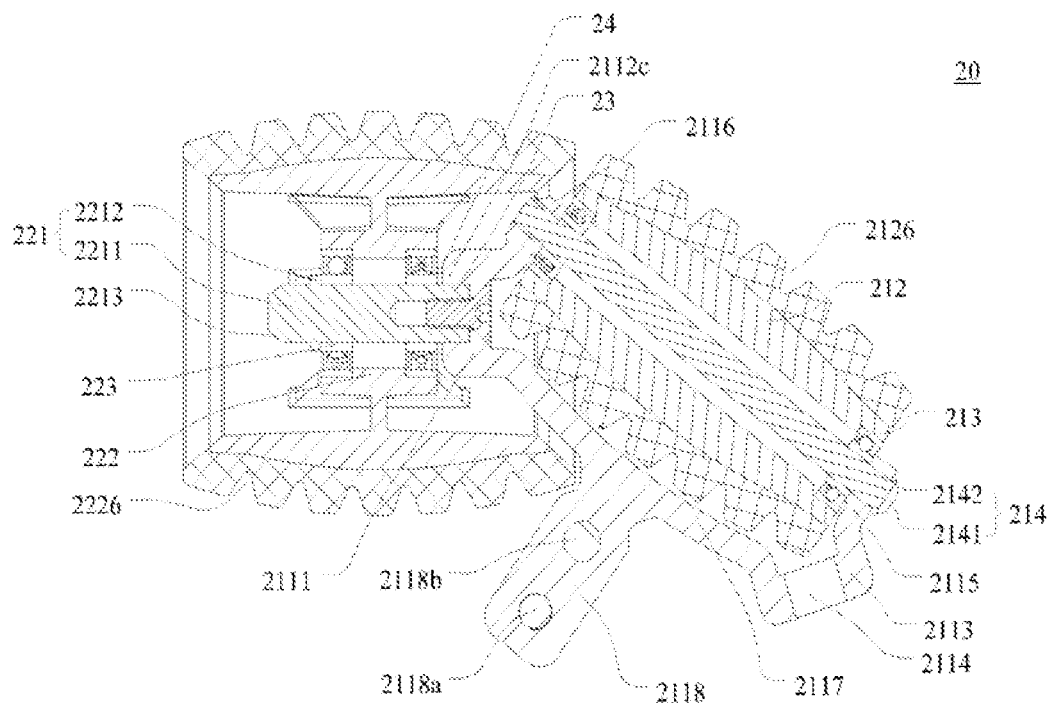
FIG. 5 is a sectional view of the roller component shown in FIG. 4.

FIG. 5 is a sectional view of the roller component shown in FIG. 4. As shown in FIG. 5, the second roller assembly 22 comprises a second shaft 221 and a second roller structure mounted to the second shaft 221, the second roller structure comprising at least a second roller 222 rotatable relative to the second shaft 221. The second roller assembly 22 is mounted to the roller bracket 211. In this way, the two rollers are mounted using one roller bracket 211, so that the gap between the rollers is smaller, ensuring the integrity of the outer contour of the omni wheel. Since the two rollers share one roller bracket 211, the structure of the hub bracket 10 can be further simplified to save the production cost and improve the assembly efficiency.

The second shaft 221 comprises a second shaft body 2211 and a limiting portion 2212 protruding from an outer peripheral surface of the second shaft body 2211, the roller bracket 211 is provided with a first connection structure 2111, and in one roller component 20, the second shaft body 2211 is connected and locked to the first connection structure 2111. For example, the roller component 20 further comprises a first locking structure, and the second shaft body 2211 is locked to the first connection structure 2111 by means of the first locking structure so as to limit the second roller structure between the limiting portion 2212 and the first connection structure 2111. That is, the second roller structure is axially limited using the limiting portion 2212 and the first connection structure 2111, so as to ensure that the second roller 222 will not shake and oscillate during running of the omni wheel and thus reduce vibrations and noise of the omni wheel, improving the running stability and the usage comfort. In addition, the adjustment of the locking degree of the first locking structure can also achieve fine adjustment of the axial position of the second roller structure, so as to further solve the problem of vibration and noise of the omni wheel. Further, since the second roller structure is limited, the hub bracket 10 may be in a simple supporting form, which not only reduces the production cost, but also can ensure the strength and load-bearing capacity of the omni wheel.

In the embodiment of the present disclosure, as shown in FIG. 2, the roller component 20 comprises a first roller 212 and a second roller 222, and after a plurality of roller components 20 are circumferentially arranged, the first rollers 212 and the second rollers 222 are arranged alternately with each other, that is, arranged in a sequence of one first roller 212, one second roller 222, one first roller 212, one second roller 222, . . . , and in this way, the first rollers 212 and the second rollers 222 in the individual roller components jointly form a full-circle roller structure. It should be understood that a full-circle roller structure mentioned here means that the first rollers 212 and the second rollers 222 are arranged along the entire circumference, but does not indicate that there is no gap between the first rollers 212 and the second rollers 222, that is, there may or may not be a gap between the first roller 212 and its adjacent second roller 222.

The second roller structure may only comprise a second roller 222, and the second roller 222 is directly sleeved on the second shaft 221, that is, the second roller 222 is in direct face-to-face connection with the second shaft 221. In this case, the second roller 222 is limited between the limiting portion 2212 and the first connection structure 2111, and the limiting portion 2212 and the first connection structure 2111 may have a small gap with the second roller 222, or the limiting portion 2212 and the first connection structure 2111 are only in contact with the second roller 222 without any axial force acting on each other, or the second roller 222 and the limiting portion 2212 may have small axial force with the first connection structure 2111, as long as the normal rotation of the second roller 222 is not affected.

In other embodiment, the second roller structure comprises a second roller 222 and a second sleeve, the second sleeve is arranged between the second roller 222 and the second shaft 221 and is in close fit with the second roller 222, and the second shaft 221 and the second sleeve can rotate relative to each other. In this case, the second sleeve is limited between the limiting portion 2212 and the first connection structure 2111, and the limiting portion 2212 and the first connection structure 2111 may have a small gap with the second sleeve, or the limiting portion 2212 and the first connection structure 2111 are only in contact with the second sleeve without any axial force acting on each other, or the limiting portion 2212 and the first connection structure 2111 may have small axial force with the second sleeve, as long as the normal rotation of the second roller 222 is not affected. The second sleeve is preferably a copper sleeve.

In order to further improve the rotation reliability of the second roller 222, in a preferred embodiment, the second roller structure comprises a second roller 222 and a second bearing 223, and the second roller 222 is rotatably mounted to the second shaft 221 by means of the second bearing 223, that is, the second roller 222 is supported on the second shaft 221 by means of the second bearing 223 and can rotate relative to the second shaft 221 (the second roller 222 is connected to the second shaft 221 in a manner of being fixed in axial position, and the second roller 222 can rotate relative to the second shaft 221). An inner ring of the second bearing 223 is clamped between the limiting portion 2212 and the first connection structure 2111.

Specifically, there is a gap between the inner ring of the second bearing 223 and the second shaft body 2211, and an outer ring of the second bearing 223 is in interference-fit with the second roller 222. It should be understood that the size of the gap between the inner ring of the second bearing 223 and the second shaft body 2211 mentioned here is not specifically limited, and there may be a larger gap or a smaller gap, as long as the inner ring of the second bearing 223 and the second shaft body 2211 can move relative to each other. In one roller component 20, the second shaft body 2211 is locked to the first connection structure 2111 by means of a first locking structure to clamp the inner ring of the second bearing 223 between the limiting portion 2212 and the first connection structure 2111. The inner ring of the second bearing 223 and the second shaft body 2211 have a gap therebetween and can move relative to each other when being not locked. Since the inner ring of the second bearing 223 and the second shaft body 2211 can move relative to each other, when the second shaft body 2211 is locked to the first connection structure 2111 by means of the first locking structure, the inner ring of the second bearing 223 is clamped by means of the limiting portion 2212 and the first connection structure 2111, so as to ensure that the second roller 222 will not shake and oscillate during running of the omni wheel and thus further reduce vibrations and noise of the omni wheel, improving the running stability and the usage comfort.

It should be understood that the feature of "the inner ring of the second bearing 223 is clamped between the limiting portion 2212 and the first connection structure 2111" mentioned here means that the inner ring of the second bearing 223 is located between the limiting portion 2212 and the first connection structure 2111, and the inner ring of the second bearing 223 is also under the action of a clamping force, and the strength of the clamping force is not specifically limited.

In the subsequent embodiments, the omni wheel according to the present disclosure is described mainly by taking an example in which the second roller structure comprises a second roller 222 and a second bearing 223, wherein an inner ring of the second bearing 223 is clamped between the limiting portion 2212 and the first connection structure 2111. It should be understood that the structures in the subsequent embodiments are also applicable to the case where the second roller structure only comprises a second roller 222 or comprises a second roller 222 and a second sleeve if there is no conflict.

The limiting portion 2212 may be of any structure by which the second roller structure can be limited. For example, the limiting portion 2212 is formed by a plurality of bump structures protruding from the outer peripheral surface of the second shaft body 2211 and evenly distributed in the circumferential direction of the second shaft body 2211. In order to facilitate machining and ensure the pressing effect, in a preferred embodiment, the limiting portion 2212 is an annular protrusion protruding from the periphery of the second shaft body 2211. The limiting portion 2212 may be fixedly connected to the second shaft body 2211 in a non-removable manner by means of bonding, welding, etc., and the limiting portion 2212 may also be fixedly connected to the second shaft body 2211 in a removable manner by means of threaded connection, clamping, etc. Preferably, in order to facilitate machining and ensure the structural reliability, the limiting portion 2212 and the second shaft body 2211 form an integral structure.

The first locking structure may be of any structure by which the second shaft body 2211 can be fastened and connected to the first connection structure 2111. For example, in an embodiment, a second fastening structure comprises a first screw 23, and in this way, the second shaft body 2211 and the first connection structure 2111 are fastened and connected together by means of the first screw 23. In one roller component 20, the first screw 23 may pass through the second shaft body 2211 from the side of the second shaft body 2211 away from the first roller 212 and be fixedly connected to the first connection structure 2111. In order to improve the connection reliability, preferably, as shown in FIG. 5, the first connection structure 2111 is provided with a connection hole 2112, and the first screw 23 passes through the roller bracket 211 via the connection hole 2112 from the side of the roller bracket 211 away from the second shaft body 2211 and is screwed to the second shaft body 2211. This not only ensures the structural reliability, but also can make full use of space at various positions in the roller components 20. Specifically, as shown in FIG. 5, a partial structure of the first roller 212 extends into the second roller 222, and the first connection structure 2111 also extends into the second roller 222 and fits with the second shaft body 2211 in the second roller 222.

In the above structure, a partial structure of the roller bracket 211 and a partial structure of the first roller 212 are nested into the second roller 222, so that the structure of the roller component 20 is more compact, and the angle difference between the first roller 212 and the second roller 222 and the roundness tolerance of the entire wheel are effectively reduced.

Figure 8:
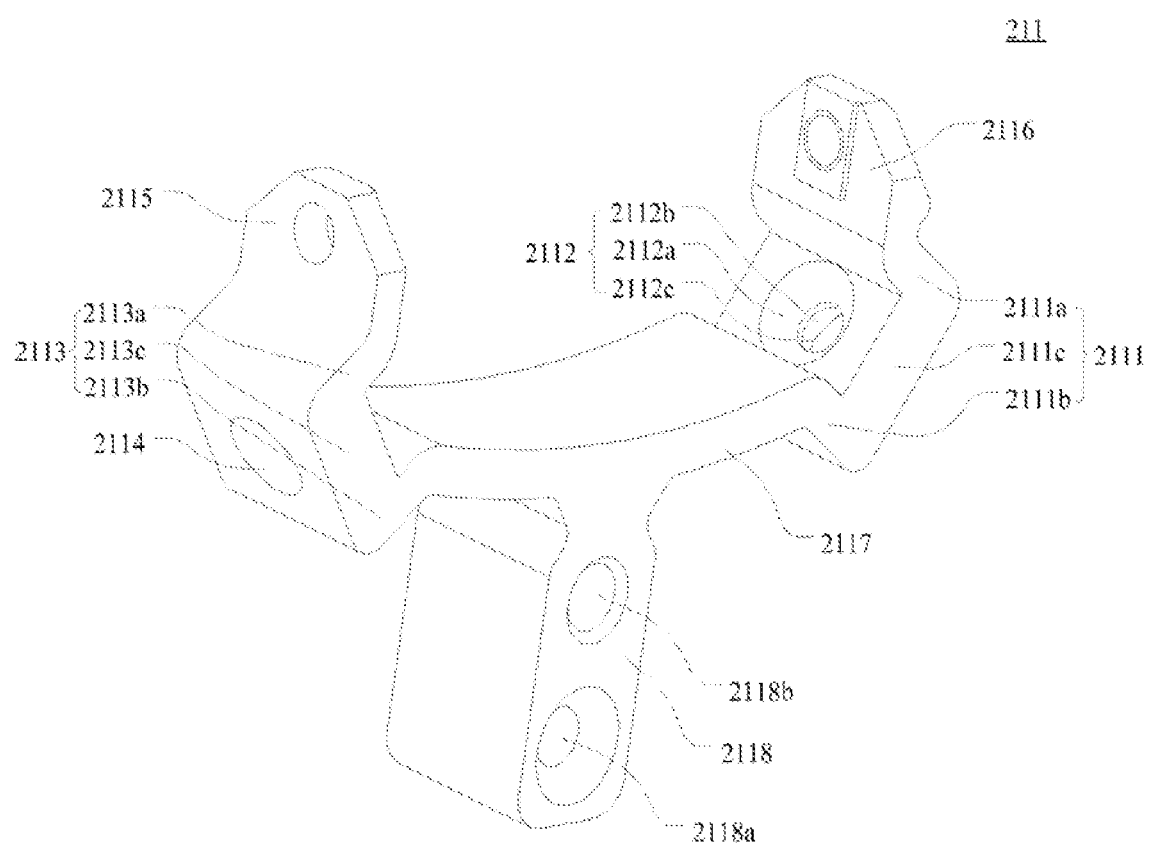
FIG. 8 is a perspective view of a roller bracket in a roller component of an omni wheel according to an embodiment of the present disclosure.

The connection hole 2112 may be a straight hole, and a rod of the first screw 23 passes through the straight hole and is then fixed to the second shaft body 2211. In order to allow the structure to be more compact, preferably, FIG. 8 is a perspective view of a roller bracket, as shown in FIGS. 5 and 8, the connection hole 2112 comprises a first hole section 2112a, a second hole section 2112b and a third hole section 2112c, which are connected in sequence, the first hole section 2112a accommodating a screw head of the first screw 23, the second hole section 2112b allowing passage of the rod of the first screw 23, and one end of the second shaft body 2211 inserted into the third hole section 2112c. This not only allows the structure to be more compact, but also enables the second shaft 221 to be well positioned and supported by means of the roller bracket 211.

Of course, it should be understood that the third hole section 2112c may not be provided, and the first connection structure 2111 may directly abut against an end face of the second shaft body 2211.

Further preferably, the axis of the first screw 23 coincides with the axis of the second shaft body 2211, so as to ensure the balance of force on the second shaft body 2211 and the first connection structure 2111 at the connection position during the assembly and use, and further ensure the running stability of the omni wheel.

Of course, it should be understood that the first locking structure may not use the above screw structure. In another preferred embodiment, the second shaft 221 is a screw (similar to the structure of a first shaft 214 in the figure). The second shaft 221 comprises a second head and a second rod, the second rod is provided with an external thread structure, and the second rod passes through the inner ring of the second bearing 223 and is screwed to the first connection structure 2111. In this way, the second head forms the limiting portion, the second rod forms the second shaft body, and the second shaft 221 itself forms the first locking structure. When the second shaft 221 is continuously screwed into the first connection structure 2111, the second head of the second shaft 221 gradually presses against the inner ring of the second bearing 223. In order to fit with a second connection structure 2113 (which will be specifically described below), further preferably, in this embodiment, the second shaft 221 is provided with an outwardly extending shaft section that protrudes from the side of the second head away from the second rod, and the outwardly extending shaft section fits with the second connection structure 2113 of the adjacent roller component so as to further ensure the reliability of the second roller 222.

In yet another preferred embodiment, the second shaft 221 comprises a screw comprising a second head and a second rod, and the limiting portion 2212 can fit with and be connected to a threaded structure on the second rod. The second rod passes through the first connection structure 2111 and the second roller structure (which is, for example, the inner ring of the second bearing 223), and the second head is connected and locked to the first connection structure 2111, for example, is directly connected and locked to the first connection structure 2111 by means of a threaded structure, or is fixedly connected to the first connection structure 2111 by means of another fastener, and the limiting portion 2212 passes through the second rod and limits the second roller structure between the limiting portion 2212 and the first connection structure 2111, for example, the limiting portion 2212 and the first connection structure 2111 are pressed against two sides of the inner ring of the second bearing 223.

One or more second bearings 223 may be provided. When one second bearing 223 is provided, the inner ring of the second bearing 223 is clamped by the limiting portion 2212 and the first connection structure 2111. In order to further improve the rotation stability of the second roller 222 and the reliability of connection with the second shaft 221, in a preferred embodiment, as shown in FIG. 5, two second bearings 223 are provided, and the inner rings of the two second bearings 223 are both clamped between the limiting portion 2212 and the first connection structure 2111.

Figure 7:
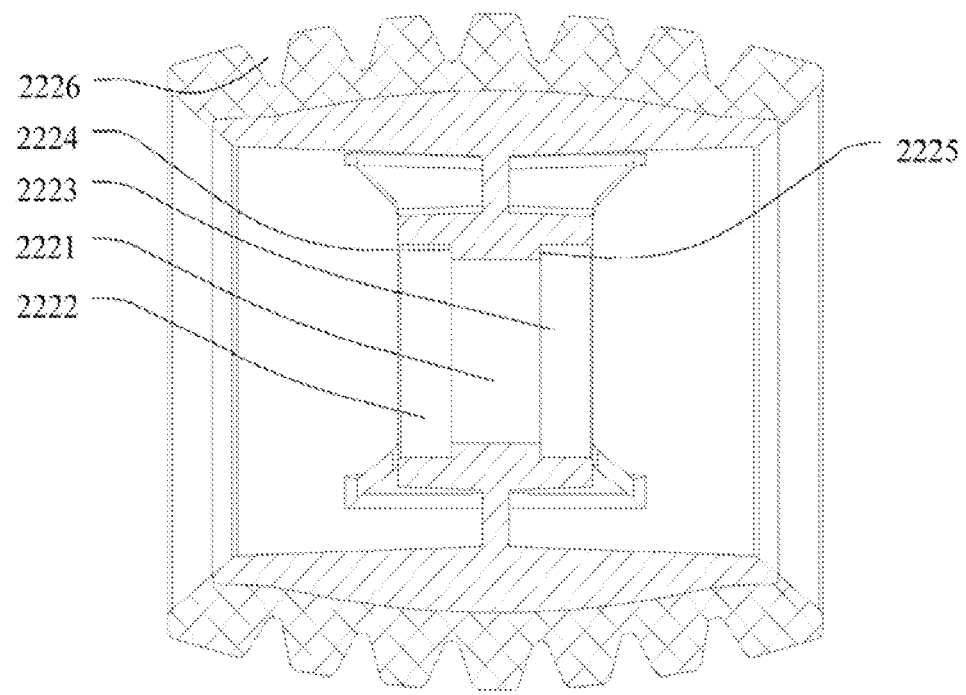
FIG. 7 is a sectional view of a second roller in FIG. 5.

Specifically, FIG. 7 is a sectional view of the second roller. As shown in FIG. 7, an inner hole of the second roller 222 comprises a fourth hole section 2221, and a fifth hole section 2222 and a sixth hole section 2223 which are respectively connected to two ends of the fourth hole section 2221, the fourth hole section 2221 having a smaller diameter than the fifth hole section 2222 and the sixth hole section 2223, so that a first stepped face 2224 is formed between the fourth hole section 2221 and the fifth hole section 2222, and a second stepped face 2225 is formed between the fourth hole section 2221 and the sixth hole section 2223. One of the second bearings 223 is arranged in the fifth hole section 2222, the outer ring of the second bearing 223 is connected to a hole wall of the fifth hole section 2222 in an interference-fit manner, for example, may be pressed into the fifth hole section 2222 in a hydraulic manner, etc., and the outer ring of the second bearing 223 abuts against the first stepped face 2224. The other second bearing 223 is arranged in the sixth hole section 2223, the outer ring of the second bearing 223 is connected to a hole wall of the sixth hole section 2223 in an interference-fit manner, for example, may be pressed into the sixth hole section 2223 in a hydraulic manner, etc., and the outer ring of the second bearing 223 abuts against the second stepped face 2225.

With the above structural arrangement, the inner rings of the two second bearings 223 are clamped between the limiting portion 2212 and the first connection structure 2111.

The limiting portion 2212 may be directly pressed against the side face of the inner ring of one of the second bearings 223 away from the first connection structure 2111. In order to ensure the pressing effect, a structure such as a washer may also be provided between the limiting portion 2212 and the inner ring of the second bearing 223. The first connection structure 2111 may be directly pressed against the side face of the inner ring of the other second bearing 223 close to the first connection structure 2111. In the embodiment shown in FIG. 5, since the side face of the first connection structure 2111 close to the second bearing 223 has a relatively large area, in order to ensure the pressing effect, preferably, a washer 24 is provided between the second bearing 223 and the first connection structure 2111.

Figure 9:
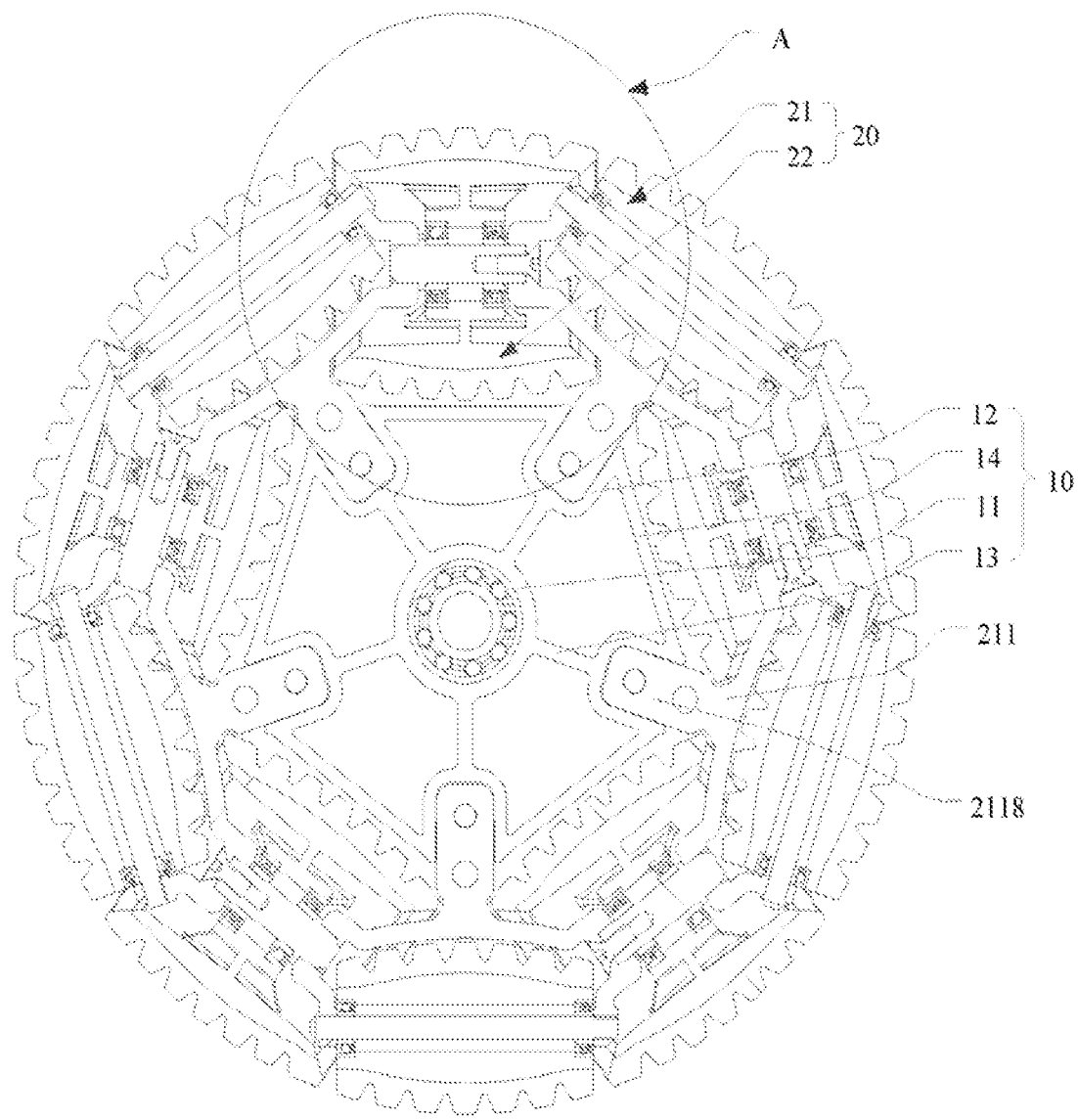
FIG. 9 is a sectional view of an omni wheel according to an embodiment of the present disclosure.
Figure 10:
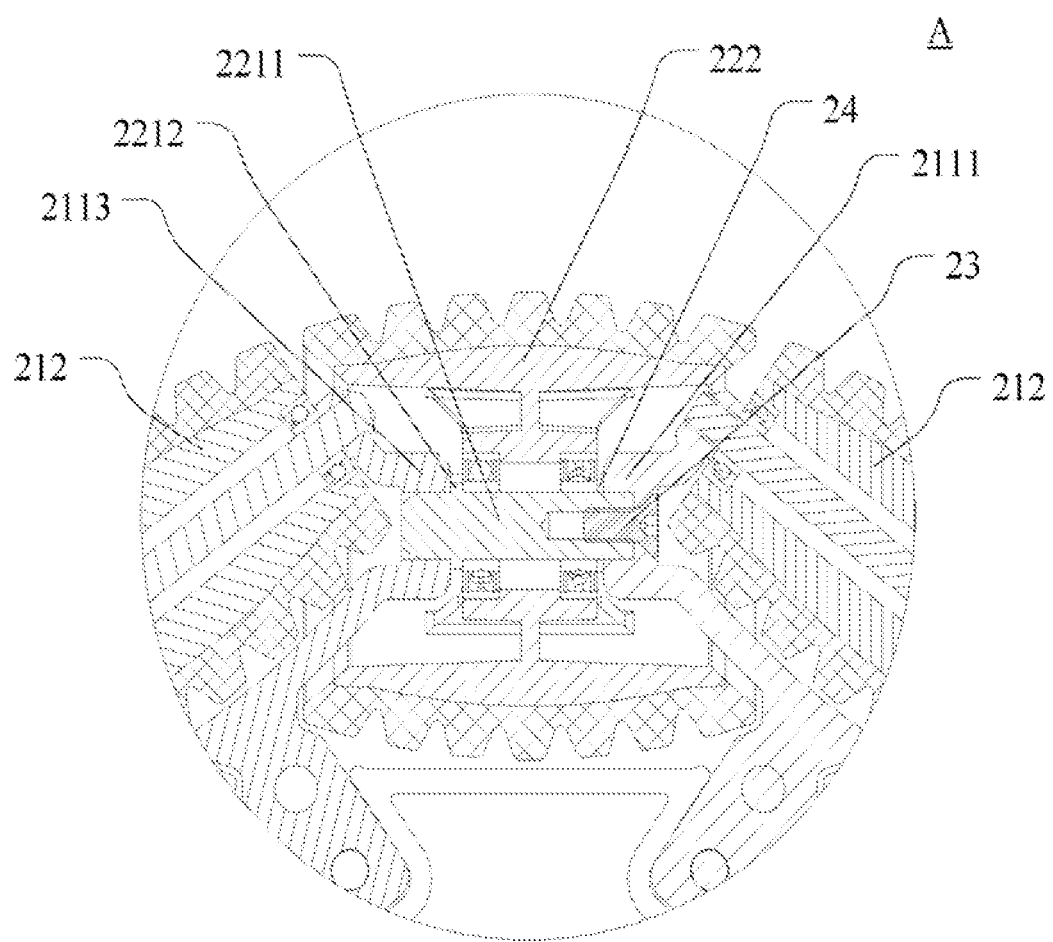
FIG. 10 is a partial enlarged view of part A in FIG. 9.

Further referring to the figure, the first connection structure 2111 is arranged at a circumferential end of the roller bracket 211. The "circumferential" mentioned here refers to the circumferential direction of the omni wheel. Since the first rollers 212 and the second rollers 222 are alternately arranged in the circumferential direction, the two circumferential ends of the roller bracket 211 refer to the end portions of the roller bracket 211 close to the second rollers 222 adjacent to the roller bracket. In order to achieve the reliable joining between the adjacent roller components 20, further preferably, the other circumferential end of the roller bracket 211 is further provided with a second connection structure 2113, and the second connection structure 2113 is configured to be connected to the end portion of the second shaft body 2211 in the adjacent roller component 20 in an insertion manner. In this way, FIG. 9 is a sectional view of an omni wheel according to an embodiment of the present disclosure, and FIG. 10 is a partial enlarged view of part A of FIG. 9. As shown in FIGS. 9 and 10, a plurality of roller components 20 are joined end-to-end in the circumferential direction to form a full-circle roller structure in which the first rollers 212 and the second rollers 222 are alternately arranged. When the plurality of roller components 20 are assembled to form a full-circle roller structure, two ends of the second shaft body 2211 are respectively supported on the first connection structure 2111 and the second connection structure 2113 of the roller bracket 211 at two ends, thereby ensuring the structural reliability of the entire assembled wheel. In addition, such an arrangement allows the force on the second roller structure to be more uniform and will not cause disturbance and shaking, so as to further reduce noise and vibrations and effectively prolong the service life.

After assembly, the second connection structure 2113 may be arranged at a distance from the limiting portion 2212. In order to further improve the reliability of the entire assembled wheel structure, as shown in FIG. 10, preferably, the second connection structure 2113 and the limiting portion 2212 on the second shaft body 2211 to which the second connection structure is connected in an insertion manner are fitted with or pressed against each other, wherein the former means that the second connection structure 2113 is in contact with the limiting portion 2212, and the latter means that the second connection structure 2113 and the limiting portion 2212 are in contact with each other and have a pressing force acting on each other. In this way, the second connection structure 2113 is useful to further ensure the clamping effect of the limiting portion 2212 and the first connection structure 2111 on the inner ring of the second bearing 223, thereby further ensuring the position reliability of the second roller 222. The insertion structure between the second connection structure 2113 and the second shaft body 2211 may be achieved by providing an insertion portion on the second connection structure 2113, providing an insertion hole in the second shaft body 2211 and inserting the insertion portion into the insertion hole. In order to simplify the structure, preferably, as shown in FIGS. 8 and 10, the second connection structure 2113 is provided with an insertion hole 2114 into which the end portion of the second shaft body 2211 of an adjacent roller component 20 is inserted, and the end portion of the second shaft body 2211 is inserted into the insertion hole 2114 to achieve the insertion of the second shaft body into the insertion hole.

In order to facilitate the insertion of the end portion of the second shaft body 2211 into the insertion hole 2114, further preferably, the end portion of the second shaft body 2211 is provided with a guide face 2213 for guiding the insertion movement. Specifically, as shown in FIG. 5, the end portion of the second shaft body 2211 is provided with a large-angle chamfer, and the chamfered face forms the guide face 2213, so that the second shaft body 2211 can be inserted into the insertion hole 2114 quickly and smoothly, thereby effectively improving the assembly efficiency. Of course, it should be understood that the guide face may also be configured on the insertion hole 2114, that is, providing with a guide chamfer on the hole wall of the insertion side of the insertion hole 2114 can also provide a function of guiding the second shaft body 2211. It is also possible that the insertion hole 2114 and the second shaft body 2211 are each provided with a guide face for guiding.

The first connection structure 2111 and the second connection structure 2113 may be of any structure by which the above connection with the second shaft body 2211 can be achieved. The first connection structure 2111 and the second connection structure 2113 according to a specific embodiment will be described below with reference to the roller bracket 211. As shown in FIG. 8, the roller bracket 211 comprises a first supporting portion 2115 and a second supporting portion 2116 which are arranged opposite each other, a first connection portion 2117 for connecting the first supporting portion 2115 to the second supporting portion 2116, and a second connection portion 2118 for connecting the first connection portion 2117 to the hub bracket 10. The first supporting portion 2115 and the second supporting portion 2116 are configured to support the first roller 212.

The first connection structure 2111 is arranged at a position where the first connection portion 2117 is joined to the second supporting portion 2116. Specifically, the first connection structure 2111 is formed by protruding away from the first roller 212 from the position where the first connection portion 2117 is joined to the second supporting portion 2116. The first connection structure 2111 is n-shaped, and comprises a first plate portion 2111a, a second plate portion 2111b arranged opposite the first plate portion 2111a, and a third plate portion 2111c connected to the first plate portion 2111a and the second plate portion 2111b. The third plate portion 2111c is substantially perpendicular to the first plate portion 2111a and the second plate portion 2111b, so that the first plate portion 2111a, the second plate portion 2111b and the third plate portion 2111c form an n-shaped structure. A connection hole 2112 is provided in the third plate portion 2111c, the end portion of the second shaft body 2211 is inserted into the third plate portion 2111c, and the third plate portion 2111c is fixedly connected to the second shaft body 2211 by means of the first screw 23. Configuring the first connection structure 2111 in an n-shape can not only facilitate the connection of the second shaft body 2211 to the third plate portion 2111c, but also make use of a partial space of the n-shaped structure (that is, the partial space between the first plate portion 2111a and the second plate portion 2111b) to accommodate a partial structure of the first roller 212 to allow the first roller 212 to be arranged closer to the second roller 222, so that the structure of the roller component 20 is more compact.

The second connection structure 2113 is arranged at a position where the first connection portion 2117 is joined to the first supporting portion 2115. Specifically, the second connection structure 2113 is formed by protruding away from the first roller 212 from the position where the first connection portion 2117 is joined to the first supporting portion 2115. The second connection structure 2113 is n-shaped, and comprises a fourth plate portion 2113a, a fifth plate portion 2113b arranged opposite the fourth plate portion 2113a, and a sixth plate portion 2113c connected to the fourth plate portion 2113a and the fifth plate portion 2113b. The sixth plate portion 2113c is substantially perpendicular to the fourth plate portion 2113a and the fifth plate portion 2113b, so that the fourth plate portion 2113a, the fifth plate portion 2113b and the sixth plate portion 2113c form an n-shaped structure. An insertion hole 2114 is provided in the sixth plate portion 2113c, and the end portion of the second shaft body 2211 in the adjacent roller component 20 is inserted into the sixth plate portion 2113c. The second connection structure 2113 is n-shaped, so that the second connection structure 2113 is symmetrical to the first connection structure 2111, which is more convenient for structural design, and the n-shaped structure is also configured to accommodate the partial structure of the first roller 212.

In order to simplify the structure, the portion of the first connection portion 2117 between the first connection structure 2111 and the second connection structure 2113 is preferably of a plate-like structure, for example, may be of a flat plate structure, a curved plate structure or a corrugated plate structure. In order to improve the structural reliability and better adapt to the first roller 212, as shown in FIG. 8, the portion of the first connection portion 2117 between the first connection structure 2111 and the second connection structure 2113 is of a curved plate structure adapted to the outer contour of the first roller 212.

The second connection portion 2118 may be of any structure by which the first connection portion 2117 can be conveniently connected to the hub bracket 10, and is, for example, a connecting block radially protruding inwards from the first connection portion 2117. In order to enable the first roller 212 to have more structures extending into the second roller 222, preferably, the second connection portion 2118 is located in the middle of the first connection portion 2117 in the circumferential direction, and is of a thick plate structure radially extending inwards from the first connection portion 2117, and the thick plate structure extends in an axial direction of the omni wheel until it is respectively flush with the two axial end faces of the first connection portion 2117. The second connection portion 2118 is provided with a fixing hole for fixing the second connection portion to the hub bracket 10. In a preferred embodiment, the second connection portion 2118 is provided with a second pin hole 2118a and a second fixing hole 2118b, the second pin hole 2118a and the second fixing hole 2118b both penetrate the second connection portion 2118 in the axial direction of the omni wheel, have their axes parallel to each other, and are located in the same radial direction of the omni wheel, so as to fit with the structure on the hub bracket 10 to achieve reliable and fixed connection of the second connection portion 2118 to the hub bracket 10 (which will be specifically described below).

Further, as shown in FIG. 5, the first roller assembly 21 further comprises a first shaft 214, the first roller 212 is mounted to the first shaft 214, and the first supporting portion 2115, the second supporting portion 2116 and the first shaft 214 are connected and locked to each other. For example, the first supporting portion 2115, the second supporting portion 2116 and the first shaft 214 are locked by means of a second locking structure so as to limit the first roller structure between the first supporting portion and the second supporting portion. That is, the first roller structure is axial limited by means of the first supporting portion 2115 and the second supporting portion 2116, so as to ensure that the first roller 212 will not shake and oscillate during running of the omni wheel, and thus further reduce vibrations and noise of the omni wheel, improve the running stability and the usage comfort. In addition, the adjustment of the locking degree of the second locking structure can further achieve fine adjustment of the axial position of the first roller structure, so as to further solve the problem of the vibration and noise of the omni wheel.

The first roller structure may only comprise a first roller 212, and the first roller 212 is directly sleeved on the first shaft 214, that is, the first roller 212 is in direct face-to-face connection with the first shaft 214. In this case, the first roller 212 is limited between the first supporting portion 2115 and the second supporting portion 2116, and the first supporting portion 2115 and the second supporting portion 2116 may have a small gap with the first roller 212, or the first supporting portion 2115 and the second supporting portion 2116 are only in contact with the first roller 212 without any axial force acting on each other, or the first supporting portion 2115 and the second supporting portion 2116 may have small axial force with the first roller 212, as long as the normal rotation of the first roller 212 is not affected.

In other embodiments, the first roller structure comprises a first roller 212 and a first sleeve, the first sleeve is arranged between the first roller 212 and the first shaft 214 and is in close fit with the first roller 212, and the first shaft 214 and the first sleeve can rotate relative to each other. In this case, the first sleeve is limited between the first supporting portion 2115 and the second supporting portion 2116, and the first supporting portion 2115 and the second supporting portion 2116 may have a small gap with the first sleeve, or the first supporting portion 2115 and the second supporting portion 2116 are only in contact with the first sleeve without any axial force acting on each other, orthe first supporting portion 2115 and the second supporting portion 2116 may have small axial force with the first sleeve, as long as the normal rotation of the first roller 212 is not affected. The first sleeve is preferably a copper sleeve.

In order to further improve the rotation reliability of the first roller 212, in a preferred embodiment, the first roller structure comprises a first roller 212 and a first bearing 213, and the first roller 212 is rotatably mounted to the first shaft 214 by means of the first bearing 213, that is, the first roller 212 is supported on the first shaft 214 by means of the first bearing 213 and can rotate relative to the first shaft 214 (the first roller 212 is connected to the first shaft 214 in a manner of being fixed in axial position, and the first roller 212 can rotate relative to the first shaft 214). An inner ring of the first bearing 213 is clamped between the first supporting portion 2115 and the second supporting portion 2116.

Specifically, there is a gap between the inner ring of the first bearing 213 and the first shaft 214, and an outer ring of the first bearing 213 is in interference-fit with the first roller 212. It should be understood that the size of the gap between the inner ring of the first bearing 213 and the first shaft 214 mentioned here is not specifically limited, and there may be a larger gap or a smaller gap, as long as the inner ring of the first bearing 213 and the first shaft 214 can move relative to each other.

The first supporting portion 2115, the second supporting portion 2116 and the first shaft 214 are locked by means of a second locking structure to clamp the inner ring of the first bearing 213 between the first supporting portion 2115 and the second supporting portion 2116. Because there is a gap between the inner ring of the first bearing 213 and the first shaft 214, they can move relative to each other before being locked. Just because the inner ring of the first bearing 213 and the first shaft 214 can move relative to each other, when the first shaft 214 is locked to the first supporting portion 2115 and the second supporting portion 2116 by means of the second locking structure, the inner ring of the first bearing 213 is clamped by the first supporting portion 2115 and the second supporting portion 2116, so as to ensure that the first roller 212 will not shake and oscillate during running of the omni wheel and thus further reduce vibrations and noise of the omni wheel, improve the running stability and the usage comfort.

It should be understood that the feature of "the inner ring of the first bearing 213 is clamped between the first supporting portion 2115 and the second supporting portion 2116" mentioned here means that the inner ring of the first bearing 213 is located between the first supporting portion 2115 and the second supporting portion 2116, and the inner ring of the first bearing 213 is also subjected to a certain clamping force, and the magnitude of the clamping force is not specifically limited.

In the subsequent embodiments, the omni wheel according to the present disclosure is described mainly by taking an example in which the first roller structure comprises a first roller 212 and a first bearing 213, with an inner ring of the first bearing 213 being clamped between the first supporting portion 2115 and the second supporting portion 2116. It should be understood that the structures in the subsequent embodiments are also applicable to the case where the first roller structure only comprises a first roller 212 or comprises a first roller 212 and a first sleeve if there is no conflict.

In order to ensure that there is a certain relative displacement margin between the first supporting portion 2115 and the second supporting portion 2116 in an non-locked state, in the embodiment shown in FIG. 8, the first supporting portion 2115, the second supporting portion 2116 and the first connection portion 2117 of the roller bracket 211 form an integral plate structure, so that the roller bracket 211 has a certain elasticity to ensure that the first supporting portion 2115 and the second supporting portion 2116 can perform certain relative movement during locking, so as to better clamp the inner ring of the first bearing 213.

When the roller bracket 211 is in an unloaded state (i.e., an unassembled part state), the distance between the first supporting portion 2116 and the second supporting portion 2117 may or may not be equal to the dimension of the inner ring of the first bearing 213 in the axial direction of the first roller 212. In the embodiment in which the first screw 23 passes through the first connection structure 2111 from one side of the roller bracket 211 and is fastened and connected to the second shaft body 2211 in a threaded manner, preferably, when the roller bracket 211 is in an unloaded state, the distance between the first supporting portion 2115 and the second supporting portion 2116 is slightly less than the dimension of the inner ring of the first bearing 213 in the axial direction of the first roller 212. In this way, when the inner ring of the first bearing 213 is mounted between the first supporting portion 2115 and the second supporting portion 2116, the first supporting portion 2115 is separated from the second supporting portion 2116, so that the first screw 23 is further tightened by means of the first connection structure 2111, thereby further improving the clamping effect on the inner ring of the second bearing 223.

Of course, it should be understood that the first supporting portion 2115, the second supporting portion 2116 and the first connection portion 2117 may also not be configured as the integral plate structure mentioned above. In another embodiment, the roller bracket 211 is configured as a separate structure, that is, a two-half structure, in which the first supporting portion 2115, a part of the first connection portion 2117 and a part of the second connection portion 2118 form a half of the roller bracket 211, and the second supporting portion 2116, the other part of the first connection portion 2117 and the other part of the second connection portion 2118 form the other half of the roller bracket 211, wherein the two halves are fastened and connected to each other by means of a fastener.

The second locking structure may be of any structure by which the first shaft 214 can be fastened and connected to the first supporting portion 2115 and the second supporting portion 2116. For example, in the embodiment shown in FIG. 5, the first shaft 214 is a screw, and the first shaft 214 comprises a first head 2141 and a first rod 2142, the first rod 2142 being provided with an external thread structure, the first rod 2142 passing through the first supporting portion 2115 and the first roller structure (e.g., the inner ring of the first bearing 213) and being screwed to the second supporting portion 2116, and the first head 2141 being pressed against the first supporting portion 2115. The first shaft 214 forms the second locking structure. During assembly, an end portion of the first shaft 214 passes through the first supporting portion 2115 and the inner ring of the first bearing 213, and is continuously screwed into the second supporting portion 2116. During screwing, the first head 2141 gradually presses against the first supporting portion 2115, so that the inner ring of the first bearing 213 is clamped by the first supporting portion 2115 and the second supporting portion 2116.

Of course, the second locking structure may also be a further structure, for example, the second locking structure comprises two second screws by which the first supporting portion 2115 and the second supporting portion 2116 are respectively fastened and connected to the end portions of the first shaft 214, so that the inner ring of the first bearing 213 is clamped by the first supporting portion 2115 and the second supporting portion 2116.

One or more first bearings 213 may be provided. When one inner ring 213 of the first bearing 213 is provided, the inner ring of the first bearing 213 is clamped by the first supporting portion 2115 and the second supporting portion 2116. In order to further improve the rotation stability of the first roller 212 and the reliability of connection with the first shaft 214, in a preferred embodiment, as shown in FIG. 5, two first bearings 213 are provided, and the inner rings of the two first bearings 213 are both clamped between the first supporting portion 2115 and the second supporting portion 2116.

Figure 6:
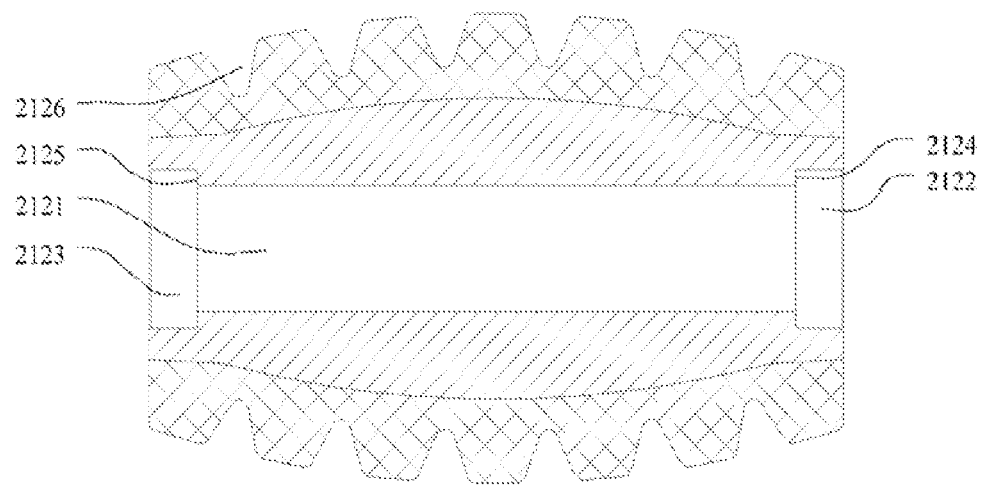
FIG. 6 is a sectional view of a first roller in FIG. 5.

Specifically, FIG. 6 is a sectional view of a first roller. As shown in FIG. 6, an inner hole of the first roller 212 comprises a seventh hole section 2121, and an eighth hole section 2122 and a ninth hole section 2123 respectively connected to two ends of the seventh hole section 2121, the seventh hole section 2121 having a smaller diameter than the eighth hole section 2122 and the ninth hole section 2123, so that a third stepped face 2124 is formed between the seventh hole section 2121 and the eighth hole section 2122, and a fourth stepped face 2125 is formed between the seventh hole section 2121 and the ninth hole section 2123. One of the first bearings 213 is arranged in the eighth hole section 2122, the outer ring of the first bearing 213 is connected to a hole wall of the eighth hole section 2122 in an interference-fit manner, for example, may be pressed into the eighth hole section 2122 in a hydraulic manner, etc., and the outer ring of the first bearing 213 abuts against the third stepped face 2124. The other first bearing 213 is arranged in the ninth hole section 2123, the outer ring of the first bearing 213 is connected to a hole wall of the ninth hole section 2123 in an interference-fit manner, for example, may be pressed into the ninth hole section 2123 in a hydraulic manner, etc., and the outer ring of the first bearing 213 abuts against the fourth stepped face 2125.

With the above structural arrangement, two inner rings of the first bearings 213 are both clamped between the first supporting portion 2115 and the second supporting portion 2116. The first supporting portion 2115 may be directly pressed against the inner ring of one of the first bearings 213, and in this case, in order to ensure the pressing effect, preferably, the side of the first supporting portion 2115 close to the first bearing 213 is provided with a protruding structure that is adapted to the inner ring of the first bearing 213. Alternatively, in another embodiment, a washer is provided between the first supporting portion 2115 and the inner ring of the first bearing 213.

Similarly, the second supporting portion 2116 may be directly pressed against the inner ring of the other first bearing 213, and in this case, in order to ensure the pressing effect, preferably, the side of the second supporting portion 2116 close to the first bearing 2134 is provided with a protruding structure that is adapted to the inner ring of the first bearing 213. Alternatively, in another embodiment, a washer is provided between the second supporting portion 2116 and the inner ring of the first bearing 213.

The first roller 212 and the second roller 222 each comprise a rigid portion in the middle and an elastic buffer portion that covers the periphery of the rigid portion. In order to prevent the omni wheel from slipping, a surface of the elastic buffer portion is provided with anti-slip lines. Specifically, as shown in FIG. 6, the elastic buffer portion of the first roller 212 is provided with a plurality of axially arranged first anti-slip ring grooves 2126. As shown in FIG. 7, the elastic buffer portion of the second roller 222 is provided with a plurality of axially arranged second anti-slip ring grooves 2226. In order to ensure the running stability of the omni wheel during running, preferably, the circumferential dimension of the opening of the first anti-slip groove 2126 is approximately the same as that of the opening of the second anti-slip grooves 2226. Further, the circumferential dimension of the gap between adjacent first roller 212 and second roller 222 is also approximately the same as the aforementioned two dimensions, so that the omni wheel can always maintain regular movement connection during the entire rotation process, thereby ensuring the running stability of the omni wheel.

The first roller 212 may be a large roller of the omni wheel, and the second roller 222 may be a small roller of the omni wheel, or, as shown in FIG. 5, the first roller 212 is a small roller of the omni wheel, and the second roller 222 is a large roller of the omni wheel. The number of the first rollers 212 and the number of the second rollers 222 are not limited. For example, five first rollers and five second rollers may be provided, as shown in FIG. 2, or six or a different number of the first rollers and six or a different number of the second rollers may be provided.

Figure 11:
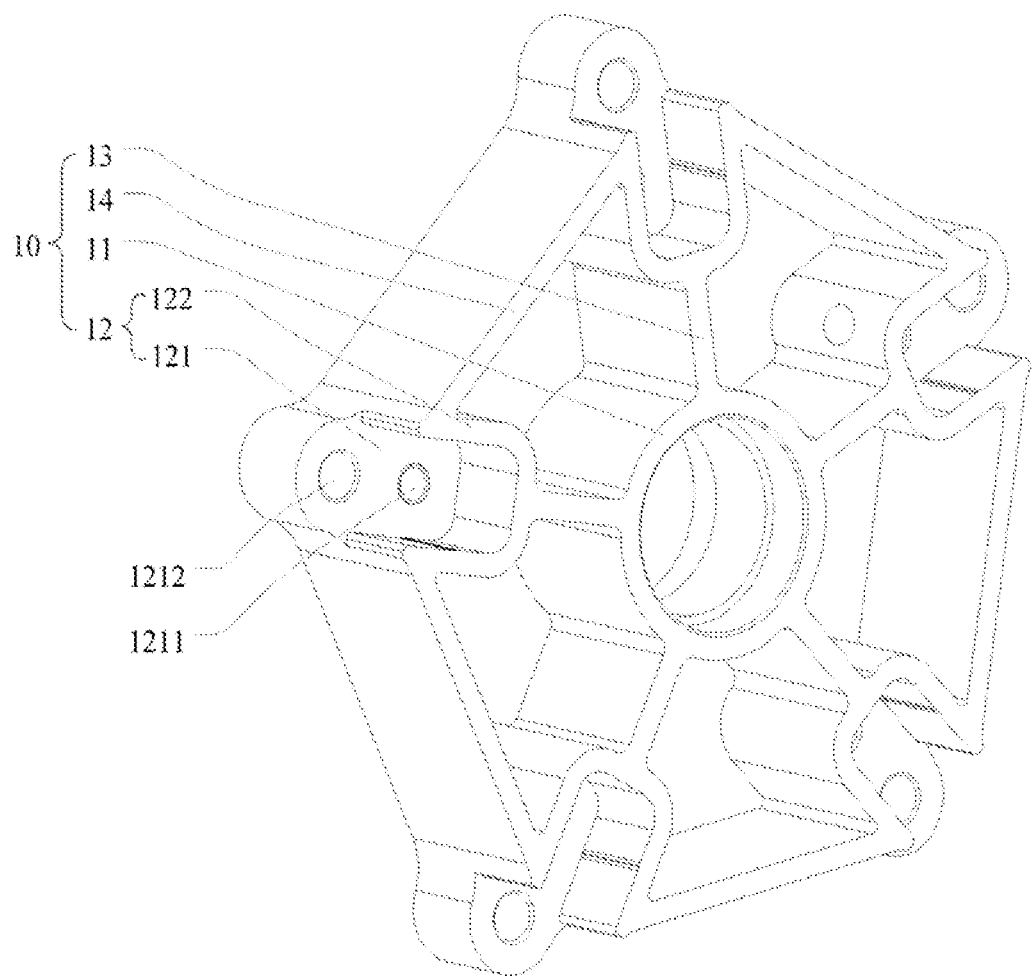
FIG. 11 is a perspective view of a hub bracket of an omni wheel according to an embodiment of the present disclosure.

The hub bracket 10 may be of any structure by which the roller components 20 can be fixed together. For example, the hub bracket may be two clamping plates respectively fixed to the roller component 20 from two sides of the roller component 20. As another example, the hub bracket 10 may also be of an integral structure. In a specific embodiment, FIG. 11 is a perspective view of a hub bracket of an omni wheel according to an embodiment of the present disclosure. As shown in FIG. 11, the hub bracket 10 comprises an intermediate shaft sleeve 11, a plurality of mounting portions 12 arranged on an outer side of the intermediate shaft sleeve 11 and uniformly arranged along the periphery of the intermediate shaft sleeve 11, first connecting ribs 13 for connecting the intermediate shaft sleeve 11 to the mounting portions 12, and second connecting ribs 14 for connecting the adjacent mounting portions 12, the intermediate shaft sleeve 11 being configured to connect the omni wheel to the moving device, and the plurality of mounting portions 12 being respectively configured to be connected to the second connection portions 2118 of the individual roller components 20. Such a frame structure can further improve the vibration buffering effect of the omni wheel, thereby ensuring the running stability of the omni wheel.

In order to facilitate mounting of the roller components, further preferably, the mounting portion 12 comprises a guide slot for guiding and limiting the mounting of the second connection portion 2118 into the mounting portion 12. For example, in the embodiment shown in FIG. 11, the mounting portion 12 comprises a mounting plate portion 121, and the mounting plate portion 121 is provided with a first pin hole 1211 and a first fixing hole 1212. A partial periphery of the mounting plate portion 121 is provided with a guide plate 122, the guide plate 122 encloses the guide slot, and the second connection portion 2118 is mounted into the guide slot, so that the second pin hole 2118a of the second connection portion 2118 is aligned with the first pin hole 1211 in the mounting plate portion 121, and the second fixing hole 2118b in the second connection portion 2118 is aligned with the first fixing hole 1212 in the mounting plate portion 121, thereby facilitating a pin shaft to pass through the first pin hole 1211 and the second pin hole 2118a to achieve positioning between the second connection portion 2118 and the mounting plate portion 121, and facilitating a fastener 40 to pass through the first fixing hole 1212 and the second fixing hole 2118b to achieve fixed connection of the second connection portion 2118 to the mounting plate portion 122.

The roller components 20 is connected to the hub bracket 10 in a detachable manner, which is convenient for assembly and effectively improves the yield of products. The roller component 20 can be replaced separately after being damaged, which is convenient for maintenance and effectively reduces the costs.

An assembly process for an omni wheel according to the embodiment of FIG. 3 is as follows.

In the step of assembling each roller component 20,
two second bearings 223 are mounted into the second roller 222;
the second shaft 221 is inserted into the inner rings of the two second bearings 223, with the end portion being inserted into a third hole section 2111c of the first connection structure 2111 of the roller bracket 211;
the first screw 23 passes through the first hole section 2111a and the second hole section 2111b of the first connection structure 2111 and is fastened and connected to the second shaft 221 in a threaded manner, while the limiting portion 2212 abuts against the inner ring of one of the second bearings 223, and the first connection structure 2111 abuts against the inner ring of the other second bearing 223;
the two first bearings 213 are mounted into the first roller 212;
the first roller 212 in which the first bearings 213 is mounted is placed between the first supporting portion 2115 and the second supporting portion 2116; and
the first shaft 214 passes through the first supporting portion 2115 and the inner ring of the first bearing 213 and is screwed and fixed to the second supporting portion 2116, so as to complete the assembly of one roller component 20.

In the step of assembling the roller components 20 to form an omni wheel, the roller components 20 are each connected to the hub bracket 10 and nested with each other to form a complete omni wheel. The adjacent roller components 20 cooperate in such a manner that the exposed end of the first roller 212 is nested into the second roller 222 in the adjacent roller component 20, and the exposed end of the second shaft 221 is mounted into the second connection structure 2113 in the adjacent roller component 20.

During the assembly of the individual roller components 20 to form the omni wheel, the guide plate 122 of the hub bracket 10 provides a function of guiding and fixing the roller components 20 during the assembly process, and the roller brackets 211 of the individual roller components 20 are nested with each other under the restriction and guiding by the guide plate 122, so as to finally form a complete and consistent tire tread. In addition, during the nesting of the individual roller components 20 with each other, the guide face 2213 provides a good guiding function, facilitates the smooth insertion of the second shaft 221 into the second connection structure 2113, thereby achieving smoother assembly.

The embodiments of the present disclosure further provide a moving device, which comprises a body and the omni wheels as described above mounted to the body, so as to ensure the running stability of the moving device and reduce noise and vibrations during the movement of the moving device. The moving device may be any device that requires omnidirectional movement, such as a robot, a trolley, a transfer conveyor, a freight vehicle, a suitcase, and the like.

The embodiments or implementations in this specification are described in a progressive manner, each embodiment focuses on the difference from other embodiments, and for the same or similar parts of the embodiments, reference can be made to each other.

In the description of this specification, the description with reference to the term such as "one embodiment", "some embodiments", "an illustrative embodiment", "an example", "a specific example" or "some examples" means that the specific features, structures, materials or characteristics described with reference to the embodiments or examples are included in at least one embodiment or example of the present disclosure. In this specification, the illustrative expressions of the above terms do not necessarily refer to the same embodiments or examples. In addition, the specific features, structures, materials, or characteristics described may be combined in any one or more embodiments or examples in an appropriate manner.

It should be finally noted that the forgoing embodiments are merely used for illustrating, rather than limiting, the technical solution of the present disclosure. Although the present disclosure has been described in detail with reference to the foregoing embodiments, those of ordinary skill in the art should understand that the technical solutions specified in the foregoing embodiments could still be modified, or equivalent replacements for some or all of the technical features thereof could made, and the modifications or replacements do not make the essence of the corresponding technical solutions depart from the scope of the technical solutions of the embodiments of the present disclosure.

What is claimed is:

1. An omni wheel, comprising a hub bracket and a plurality of roller components respectively connected to the hub bracket, wherein
    each of the plurality of roller components comprises a first roller assembly and a second roller assembly, the first roller assembly comprising a roller bracket and a first roller structure arranged on the roller bracket, and the second roller assembly comprising a second shaft and a second roller structure mounted to the second shaft;
    wherein in one of the plurality of roller components, the second roller structure is axially limited with respect to the roller bracket and the second shaft;
    wherein the roller bracket is further provided with a first connection structure, and the second shaft comprises a second shaft body and a limiting portion protruding from an outer peripheral surface of the second shaft body; and wherein the second shaft body is connected and locked to the first connection structure to axially limit the second roller structure with respect to the limiting portion and the first connection structure; and
    wherein the plurality of roller components are arranged in a circumferential direction of the hub bracket, such that the first roller structure and the second roller structure of each of the plurality of roller components jointly form a full-circle roller structure, and wherein the first connection structure is arranged at a circumferential end of the roller bracket, another circumferential end of the roller bracket is provided with a second connection structure configured to be connected to an end portion of a second shaft body in an adjacent roller component in an insertion manner, and wherein the plurality of roller components are joined end-to-end in the circumferential direction to form the full-circle roller structure in which the first roller structure and the second roller structure of each of the plurality of roller components are alternately arranged.

2. The omni wheel according to claim 1, wherein the second shaft body is connected and locked to the first connection structure in a threaded manner.

3. The omni wheel according to claim 1, wherein the second connection structure fits with or presses against the limiting portion on the second shaft body to which the second connection structure is connected in an insertion manner.

4. The omni wheel according to claim 3, wherein the second connection structure is provided with an insertion hole into which the end portion of the second shaft body in the adjacent roller component is inserted, and at least one of the insertion hole and the end portion of the second shaft body to which the second connection structure is connected in an insertion manner is provided with a guide face for guiding the insertion movement.

5. The omni wheel according to claim 1, wherein the second shaft body is connected and locked to the first connection structure by a first locking structure; and
    the first locking structure comprises a first screw by which the first connection structure is fixedly connected to the second shaft body; or
    the second shaft is a screw, the second shaft comprises a second head and a second rod, the second rod passing through the second roller structure and screwed to the first connection structure, and the second head forming the limiting portion, and the second shaft forming the first locking structure; or
    the second shaft is a screw, and the second shaft comprises a second head and a second rod, the second rod passing through the first connection structure and the second roller structure, the second head being connected and locked to the first connection structure, and the limiting portion passing through the second rod to axially limit the second roller structure with respect to the limiting portion and the first connection structure.

6. The omni wheel according to claim 1, wherein the second roller structure comprises a second roller and a second bearing, the second roller being rotatably mounted to the second shaft by the second bearing, and an inner ring of the second bearing being clamped between the limiting portion and the first connection structure.

7. The omni wheel according to claim 1, wherein the roller bracket comprises a first supporting portion and a second supporting portion arranged opposite each other, a first connection portion for connecting the first supporting portion to the second supporting portion, and a second connection portion for connecting the first connection portion to the hub bracket, the first connection structure being arranged at a position where the first connection portion is joined to the second supporting portion;
    the first roller assembly further comprises a first shaft, and the first roller structure is mounted to the first shaft; and
    the first supporting portion, the second supporting portion and the first shaft are connected and locked to each other to axially limit the first roller structure with respect to the first supporting portion and the second supporting portion.

8. The omni wheel according to claim 7, wherein the first shaft is a screw, the first shaft comprises a first head and a first rod, the first rod passing through the first supporting portion and the first roller structure and screwed to the second supporting portion, and the first shaft forming a second locking structure.

9. The omni wheel according to claim 7, wherein the first roller structure comprises a first roller and a first bearing, the first roller being rotatably mounted to the first shaft by the first bearing, and an inner ring of the first bearing being clamped between the first supporting portion and the second supporting portion.

10. The omni wheel according to claim 1, wherein for each of the plurality of roller components, the roller bracket comprises a second connection portion for connecting the roller component to the hub bracket, and the hub bracket comprises a mounting portion configured to be connected to the second connection portion of the roller component.

11. The omni wheel according to claim 10, wherein the mounting portion comprises a guide slot for guiding the mounting of the second connection portion into the mounting portion.

12. A moving device, comprising a body and an omni wheel, wherein the omni wheel comprises a hub bracket and a plurality of roller components respectively connected to the hub bracket, wherein
    each of the plurality of roller components comprises a first roller assembly and a second roller assembly, the first roller assembly comprising a roller bracket and a first roller structure arranged on the roller bracket, and the second roller assembly comprising a second shaft and a second roller structure mounted to the second shaft; wherein in one of the plurality of roller components, the second roller structure is axially limited with respect to the roller bracket and the second shaft; wherein the roller bracket is further provided with a first connection structure, and the second shaft comprises a second shaft body and a limiting portion protruding from an outer peripheral surface of the second shaft body; and wherein the second shaft body is connected and locked to the first connection structure to axially limit the second roller structure with respect to the limiting portion and the first connection structure; and wherein the plurality of roller components are arranged in a circumferential direction of the hub bracket, such that the first roller structure and the second roller structure of each of the plurality of roller components jointly form a full-circle roller structure, and wherein the first connection structure is arranged at a circumferential end of the roller bracket, another circumferential end of the roller bracket is provided with a second connection structure configured to be connected to an end portion of a second shaft body in an adjacent roller component in an insertion manner, and wherein the plurality of roller components are joined end-to-end in the circumferential direction to form the full-circle roller structure in which the first roller structure and the second roller structure of each of the plurality of roller components are alternately arranged.

* * * * *